United States Patent [19]

Kephart, Jr.

[11] 4,177,014
[45] Dec. 4, 1979

[54] FLUID OPERATED ROTOR

[76] Inventor: John W. Kephart, Jr., 1115 Norsam Rd., Gladwyne, Pa. 19035

[21] Appl. No.: 5,083

[22] Filed: Jan. 22, 1979

[51] Int. Cl.² .............................................. F03D 3/06
[52] U.S. Cl. .................................... 416/197 A; 415/2
[58] Field of Search .......................... 416/197 A, 119; 415/2-4

[56] References Cited

U.S. PATENT DOCUMENTS

| 264,164 | 9/1882 | Jackson | 415/3 |
|---|---|---|---|
| 752,764 | 2/1904 | Dunne | 416/197 A X |
| 979,098 | 12/1910 | Scheubeck | 415/2 |
| 1,463,924 | 8/1923 | Ozaki | 415/2 |
| 3,942,025 | 3/1976 | Ri | 416/197 A X |
| 4,002,218 | 1/1977 | Horvat | 416/197 A X |
| 4,015,911 | 4/1977 | Darvishian | 416/119 |

FOREIGN PATENT DOCUMENTS

| 109118 | 11/1939 | Australia | 416/197 A |
|---|---|---|---|
| 478537 | 6/1929 | Fed. Rep. of Germany | 416/119 |
| 538755 | 6/1922 | France | 415/2 |
| 681719 | 5/1930 | France | 416/197 A |
| 97500 | 1/1923 | Switzerland | 415/2 |
| 244414 | 9/1926 | United Kingdom | 416/197 A |

*Primary Examiner*—Everette A. Powell, Jr.
*Attorney, Agent, or Firm*—Louis V. Schiavo

[57] ABSTRACT

A wind motor for the conversion of wind power to mechanical or electrical power includes a plurality of wind receptors which have valved passages therein for the passage of air therethrough during operation of the wind motor, especially when the receptors are moving against the wind, so as to diminish air resistance (drag) opposing such movement, thereby increasing the efficiency of the wind motor.

9 Claims, 5 Drawing Figures

FLUID OPERATED ROTOR

BACKGROUND OF THE INVENTION

1. Field of the Invention

The present invention is in the field of windmills and wind operated devices generally. More specifically, it concerns rotating cylindrical structures as contrasted with rotating planar structures, such as conventional windmills.

2. Description of the Prior Art

In the prior art some work has been done on the use of curved blades or curved winged rotors, which are adapted to rotate about a vertical axis disposed at the point where the curved wings are joined together. The S-shaped vanes or wings are the most common form of prior art. However, these have a serious disadvantage in that wind blowing into the concave portion creates a positive pressure, while negative pressure is simultaneously generated in the opposite one, restraining rotation of the rotor.

The prior art teaches that this disadvantage may be overcome by providing the S-shaped vanes or wings with louvers arranged to open and close automatically as the rotor turns, depending upon whether the surface presented to the wind is concave or convex. However, this solution of the problem has not proved to be entirely satisfactory because as the rotor picks up speed the centrifical force generated creates a tendency on the part of the louvers to function unsatisfactorily.

SUMMARY OF THE INVENTION

The primary object of this invention is to provide a more efficient rotor of the type which may be turned by the wind.

This and other objects are realized and limitations of the prior art are overcome by providing the rotor with means for neutralizing negative pressure, which otherwise would restrain rotation of the rotor.

BRIEF DESCRIPTION OF THE DRAWINGS

This and other objects and advantages of this invention and a better understanding of the principles and details of the invention will be evident from the following description taken in conjunction with the appended drawings in which.

DESCRIPTION OF THE PREFERRED EMBODIMENT

Figure 1:
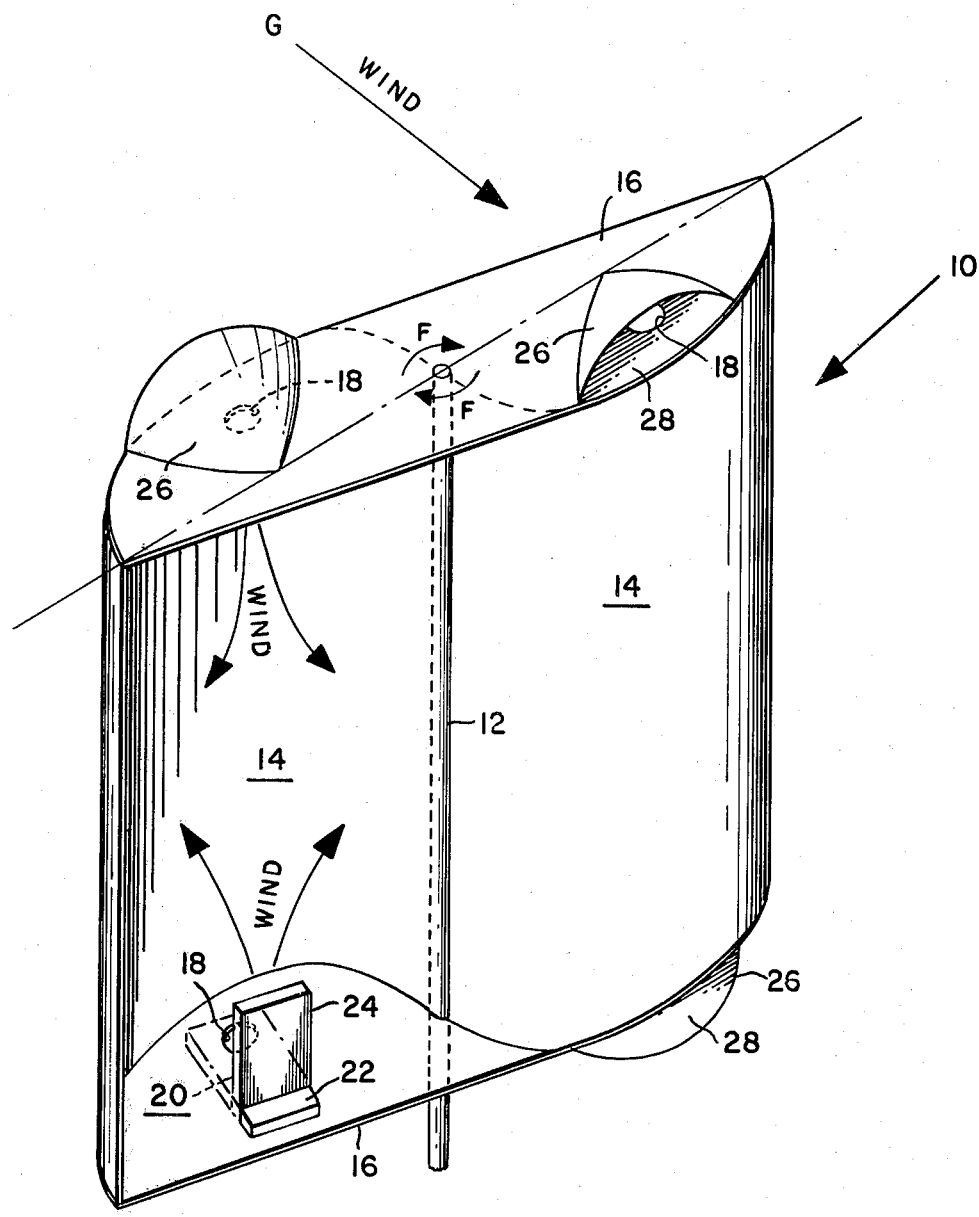
FIG. 1 is a perspective view looking down on the top and at one side of the rotor.
Figure 3:
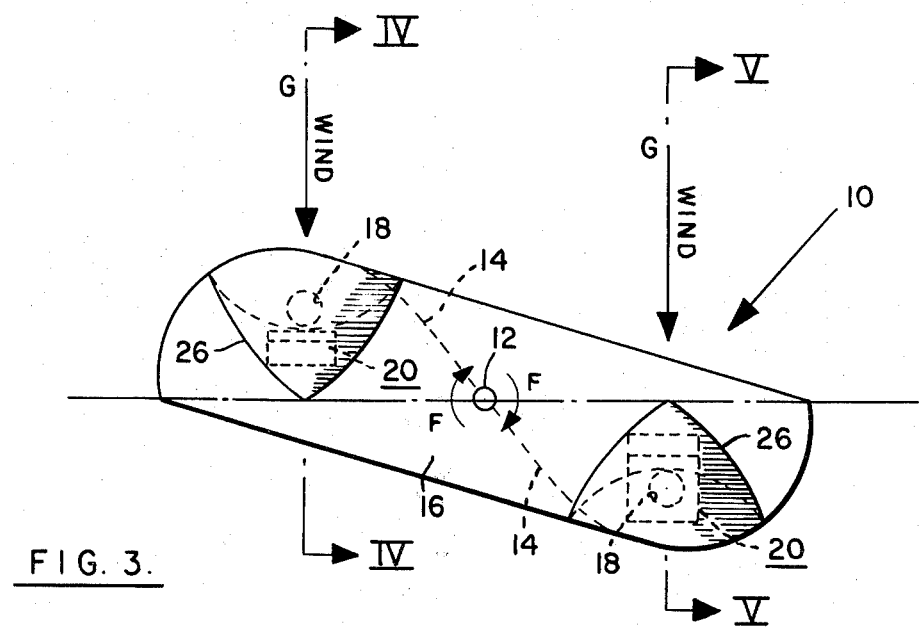
FIG. 3 is a top view of the rotor.
Figure 2:
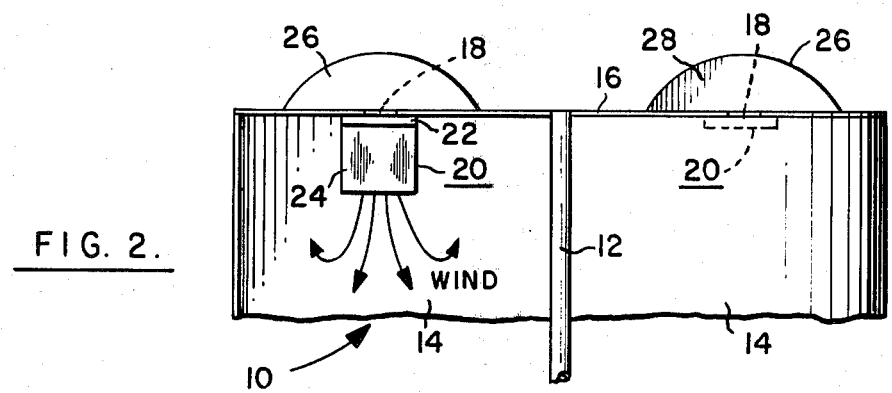
FIG. 2 is a fragmentary side view showing the upper portion of the rotor.
Figure 4:
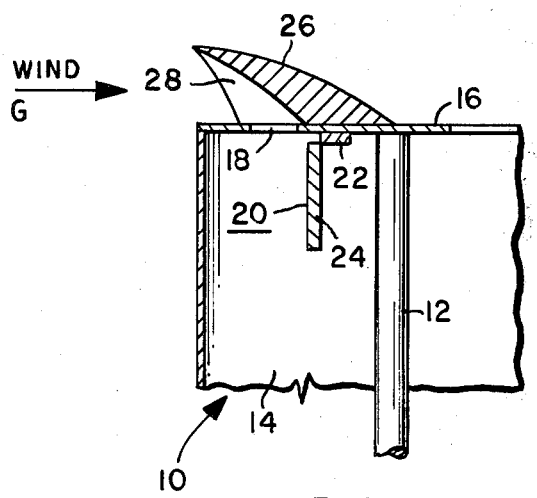
FIG. 4 is a section on lines IV—IV in FIG. 3.
Figure 5:
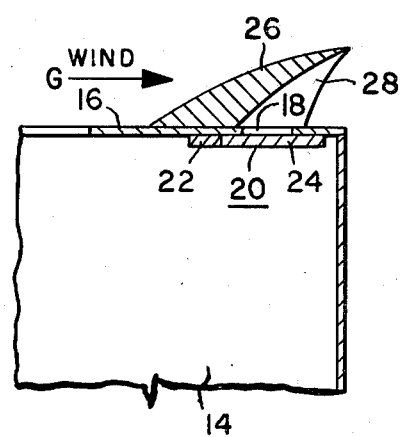
FIG. 5 is a section on lines V—V in FIG. 3.

The following description is directed to the specific embodiment of the invention disclosed in the drawings. It is not addressed to the scope of the invention, which may be practiced in a variety of forms.

Referring to the drawings, the rotor, generally designated 10, is provided with a vertically extending centrally disposed rod or axis 12. A pair of vanes or wings 14 are secured to the rod 12 and extend radially outwardly therefrom in opposite directions. The vanes or wings are curved and conjointly render the rotor S-shaped in transverse section. A pair of plates 16 extend respectively across the top and bottom of the rotor. Each plate is provided with a pair of valved openings 18, and each such opening registers with the concave side of the associated vane or wing. The valve may consist merely of a rectangular piece of suitable material 20 with one end portion 22 secured to the plate and the opposite end portion 24 free to flap in order to open and close the opening 18, as shown. Overlying each valved opening is a hood-like baffle 26 having an opening 28 presenting in the direction opposite to that in which the concave side of the associated vane or wing presents, as shown.

As will be readily understood by those skilled in the art, in the operation of the rotor, wind blowing in the direction of the arrows G turns the rotor in the direction of the arrows F. In addition, it will be appreciated that there is a tendency for vacuum to develop on the near side of the vanes or wings, as viewed in FIG. 1. On the right of the rotor, the vacuum helps turn the rotor, while on the left of the rotor, the vacuum restricts rotation of the rotor. Obviously, therefore, it would be advantageous to neutralize the vacuum on the left side of the rotor while retaining the vacuum on the right side of the rotor, the object being to cause the wind blowing in the direction G and the partial vacuum created thereby on the near side of the vanes or wings 14 to work together and in combination to automatically operate the valves 20 and thereby open and close the openings 18 to passage of air as required for maximum efficiency. Accordingly, on the left of the rotor, wind blows into the baffles 26 through the openings 28 and is directed toward the openings 18. Simultaneously, the partial vacuum on the near side of the vane or wing 14 draws or sucks air in the direction for opening the flaps 24 or valves 20. As a consequence, the valves 20 open, whereupon air from the baffles 26 is both injected into and sucked through the openings 18. Thus the tendency for a vacuum to form on the near side of the vane or wing 14 is neutralized. On the right of the rotor, the wind blowing in the direction G passes over the backs of the baffles 26, creating a partial vacuum at the mouth 28 of each baffle 26. The vacuum tends to close the flap 24 or valve 20. Simultaneously, the wind blowing in the direction G against the concave surface of the vane or wing 14 also blows against the flaps 24 tending to close them. As a consequence, the flaps 24 or valves 20 are closed and the tendency for a vacuum to form on the near side of the vane or wing 14 is not neutralized.

It should be noted that the flap valves 20 are arranged with the hinges for the flaps 24 disposed along lines extending radially outwardly from the central axis 12 thereby to eliminate the undesirable effect of centrifugal force upon operation of the flaps 24.

It will be understood, of course, that the flap valves 20 respectively associated with the vanes or wings are automatically opened and closed repreatedly by the wind and vacuum created as the rotor turns, each being closed when the concave surface of the associated vane or wing presents toward the wind, and being open when the convex surface of the associated vane or wing presents toward the wind.

While in accordance with the provisions of the patent statutes, I have illustrated and described the best form or embodiment of my invention known to me, it will be apparent to those skilled in the art that changes may be made in the form of the fluid operated rotor described without departing from the spirit and scope of the invention.

What is claimed is:

1. A fluid operated rotor device comprising
   A. a main body having a pair of fluid receptive dished sections rotatably mounted side by side with the inner sides thereof presenting in opposite directions,
   B. passageways through the rims of said dished sections placing the inner sides thereof in direct communication with atmosphere,
   C. means overlying each passageway presenting in the direction opposite to that in which the inner side of the associated dished section presents and operative for directing fluid into said passageway, and
   D. a unidirectional valve for each of said passageways arranged for being automatically opened by said fluid when the inner side of the associated dished section presents in the direction of fluid flow, and arranged for being automatically closed by said fluid when the inner side of the dished section presents in the opposite direction.

2. A rotor device according to claim 1, wherein the main body is elongated and reversely curved in transverse section and rotatable about pivot means coincident with the line of reverse curvature.

3. A rotor device according to claim 2, wherein the pivot means comprises a rod, each end portion of which projects beyond the associated end portion of said main body.

4. A rotor device according to claim 2, wherein the fluid receptive dished sections comprise the elongated and reversely curved main body and plate members respectively extending across the opposite end portions thereof.

5. A rotor device according to claim 4, wherein passageways are provided in each plate member respectively placing the inner sides of the dished sections in communication with atmosphere.

6. A rotor device according to claim 5, wherein a hood-like member is mounted upon each plate member over each passage for directing fluid thereinto.

7. A rotor device according to claim 5, wherein the unidirectional valve is provided with a hinged flap.

8. A rotor device according to claim 7, wherein the unidirectional flap valves are mounted on the plate members, within the fluid receptive sections.

9. A rotor device according to claim 8, wherein the hinge axes of the unidirectional flap valves are disposed approximately 90 degrees to the pivot rod and each of said flaps extends over the associated passageway, toward the bottom of the dished section.

* * * * *